(12) United States Patent
Neushul

(10) Patent No.: US 7,507,974 B1
(45) Date of Patent: Mar. 24, 2009

(54) GLASS CASSETTE FOR SCANNING IMAGING PLATES

(75) Inventor: Stephen Neushul, Redondo Beach, CA (US)

(73) Assignee: ICRCO, Inc., Torrance, CA (US)

(*) Notice: Subject to any disclaimer, the term of this patent is extended or adjusted under 35 U.S.C. 154(b) by 0 days.

(21) Appl. No.: 11/681,772

(22) Filed: Mar. 3, 2007

Related U.S. Application Data

(60) Continuation-in-part of application No. 10/714,087, filed on Nov. 13, 2003, which is a division of application No. 09/747,616, filed on Dec. 20, 2000, now Pat. No. 6,532,092, which is a continuation of application No. 09/450,031, filed on Nov. 24, 1999, now Pat. No. 6,188,501.

(60) Provisional application No. 60/779,047, filed on Mar. 3, 2006.

(51) Int. Cl.
*H05B 33/00* (2006.01)

(52) U.S. Cl. .................................. 250/484.4

(58) Field of Classification Search ............... 250/484.4
See application file for complete search history.

(56) References Cited

U.S. PATENT DOCUMENTS

| | | | | |
|---|---|---|---|---|
| 2,546,160 A * | 3/1951 | Lengyel | .................... | 250/459.1 |
| 3,330,953 A * | 7/1967 | Erikson | ..................... | 378/187 |
| 4,186,308 A * | 1/1980 | Erikson | ..................... | 378/183 |
| 4,802,618 A * | 2/1989 | Seto et al. | .................. | 229/68.1 |
| 5,308,994 A * | 5/1994 | Ohta et al. | .................. | 250/589 |
| 5,475,230 A * | 12/1995 | Stumpf et al. | ............. | 250/484.4 |
| 5,519,229 A * | 5/1996 | Verbeke et al. | ........... | 250/484.4 |
| 6,078,643 A * | 6/2000 | Vogelsong et al. | ......... | 378/98.2 |

FOREIGN PATENT DOCUMENTS

| | | | | |
|---|---|---|---|---|
| DE | 3821586 A | * | 1/1990 |
| EP | 394564 A | * | 10/1990 |
| JP | 2000006568 A | * | 1/2000 |

\* cited by examiner

*Primary Examiner*—David P Porta
*Assistant Examiner*—Kiho Kim
(74) *Attorney, Agent, or Firm*—Rowlett Law Group; Robert Rowlett

(57) ABSTRACT

The invention provides a cassette enclosure having an energy translucent portion for supporting an imaging plate. The cassette is adapted for use with a computed radiography device wherein an image set forth on the imaging plate can be scanned without removing the plate from the cassette.

20 Claims, 3 Drawing Sheets

COVER OPEN

COVER CLOSED

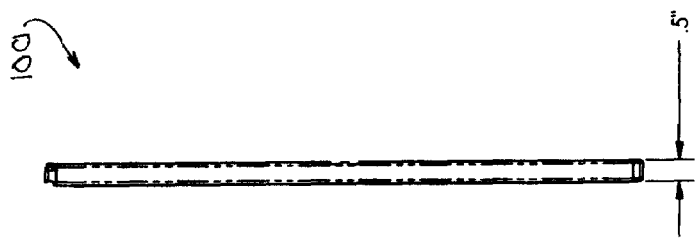
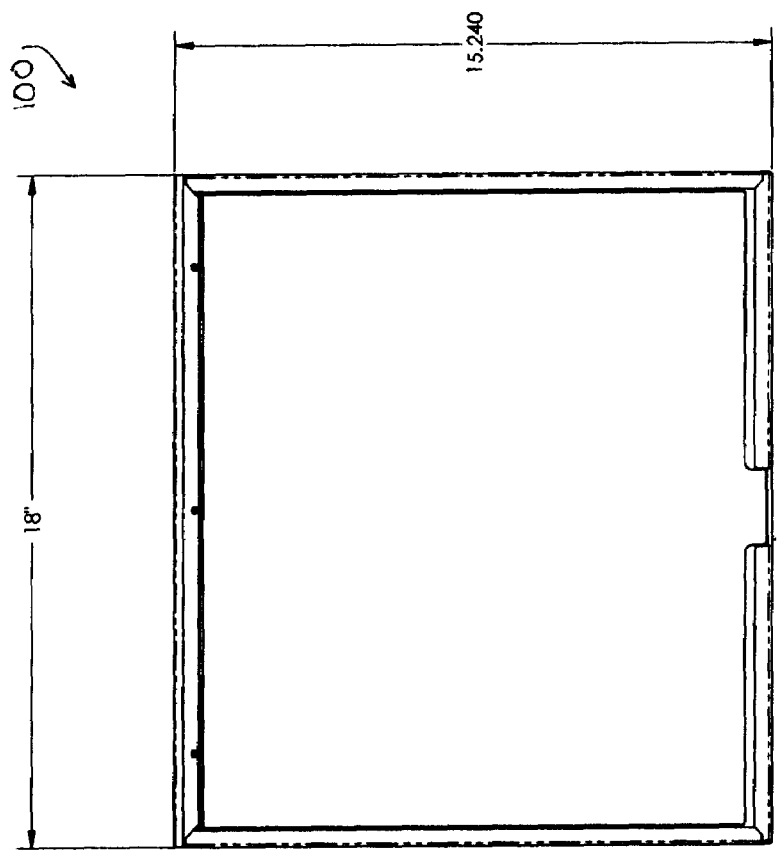
FIG 1b
FIG 1a.

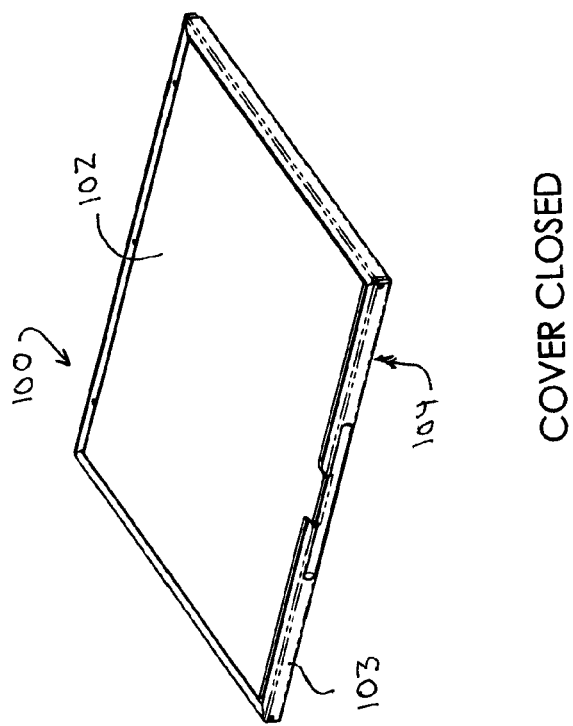
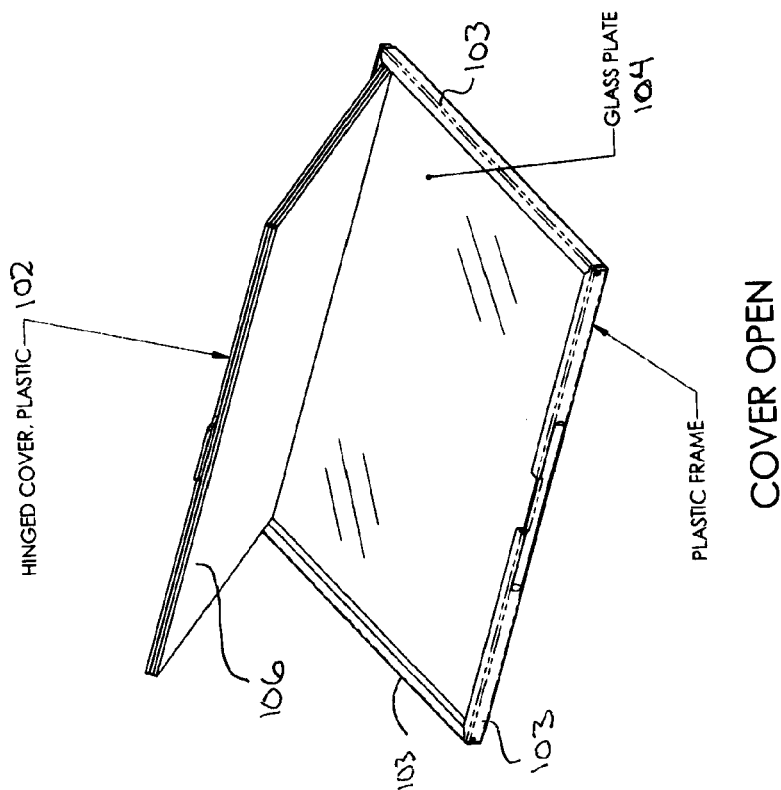

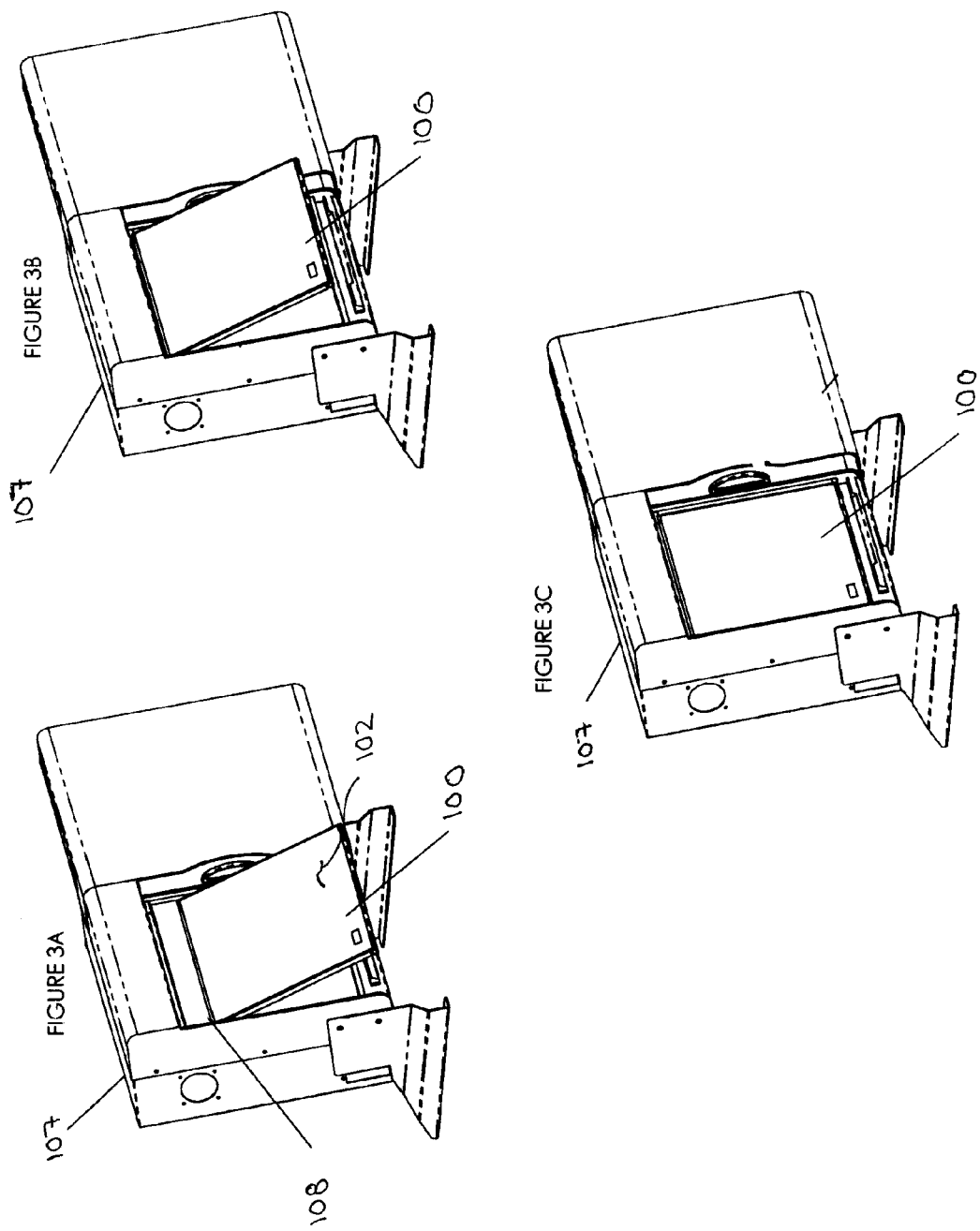

GLASS CASSETTE FOR SCANNING IMAGING PLATES

CROSS-REFERENCE TO RELATED APPLICATION

The present application claims priority from U.S. Provisional Patent Application Ser. No. 60/779,047, entitled "Glass Cassette For Scanning imaging Plates", filed on Mar. 3, 2006, which is hereby incorporated by reference in its entirety into this disclosure. The present application is also a Continuation-In-Part of co-pending application Ser. No. 10/714,087, filed on Nov. 13, 2003 by applicant Stephen Neushul entitled, "Computed Radiography X-Ray Cassette With Rigid Embedded CR Plate," which is a divisional of Ser. No. 09/747,616 filed Dec. 20, 2000 Issued U.S. Pat. No. 6,532,092, which is a Continuation of Ser. No. 09/450,031 filed Nov. 24, 1999 Issued U.S. Pat. No. 6,188,501.

BACKGROUND OF THE INVENTION

1. Field of the Invention

The present invention relates to x-ray cassettes and computed radiography and related imaging plates. More specifically, the invention relates to a novel cassette devices for supporting an imaging plate or plates and methods of using such cassette devices.

2. Description of Background Art

Traditional x-ray film has been used as part of the x-ray process for many decades. Almost thirty years ago, however, a fundamental innovation created a first version of a re-usable imaging plate that could be used instead of the traditional x-ray film. The x-rays impregnated the imaging plate with energy which, when subsequently exposed to a particular excitation or laser energy, was then released and captured, recreating the image.

The imaging plates are reflective and also erasable allowing repeated exposures particularly if there are no mechanical stresses on the imaging plate material. The use of imaging plates also eliminates the need for x-ray film and film processing. Presently these imaging plates are stored within a cassette assembly. The imaging plate is then removed from the cassette and transported within the scanning device, typically a computed radiography ("CR") device by a drive mechanism, typically a set of rollers. This roller type reading process necessitates that the phosphorescent plate be flexible. The feed mechanism used for scanning the plates is typically a set of pinch rollers. Over time the flexing and contact with the rollers causes a deleterious effect on the plate resulting in limited reusability. The phosphor materials in the plates do not degrade due to read/write cycles if mechanical and physical stresses do not act on the plate. Additional wear and tear on the plate is caused by the removal and replacement of the plate in a cassette that protects the plate from ambient energy (light) sources during transportation. In addition to causing degradation of the quality of the plate the pinch rollers can slip causing line artifacts and blurring of the image being generated.

The issue of scanning imaging plates in CR and related scanning devices is surprisingly complex. The use of a rigid cassette box type device for scanning x-rays is generally known as is the automatic removal and reloading of x-ray film from and into the cassette. Similarly, the current technology used for automatically removing, reading and replacing a CR plate relative to the supporting cassette is often similar or identical to that of x-ray film. A critical difference between scanning film and CR plates is that the CR plate is removed, read and replaced over and over again, resulting in stresses to and ultimately, potential failure of the CR plate.

To date, advances in film and plate cassettes have focused on methods of removing the plate from the cassette (for example, the CR plate from the x-ray cassette), reading it, and replacing it inside the cassette. Some of these methods may extend or reduce the life of the CR plate through the respective increase or decrease in handling and stress to the plates. In addition to the need to reduce handling of the plates, there is also a need to reduce any bending or other stresses to the plates and particularly to CR plates. Current CR plates have design limitations and constraints that include coatings and materials that may be able to withstand limited deformation through bending and surface contact of pinch rollers. Generally, CR plate photostimulatable phosphor materials do not materially degrade to read/write cycles unless there is mechanical or contact stresses to the plate.

As mentioned, current cassette designs employ read/write cycles that involve removal of the CR plate from the cassette, either by automatic or manual means. Once the plate is removed, it is driven past a scan head, erased and placed back in the cassette. Often times, these designs have cycle or use limitations for the CR plate due to the manual handling of the plate and related stresses and or damage to the plate due to the scanning process.

Another limitations to the precision of the CR scan process is the mechanism used to drive the CR plate in front of the scan head. If the process depends on pinch rollers, any slippage can cause line artifacts or simply blurring of the image. This error is similar to that found in facsimile machines that rely on pinch rollers to drive the paper past the read head.

The development of new types of CR scanning and reading devices has accelerated in the past few years. For example, a "needle phosphor storage imaging plate" ("Needle IP") reader has been proposed that can be scanned faster than traditional CR (e.g.: 14 seconds instead of 40 to 60 seconds), with apparently less x-ray dose to the patient, at higher resolution (e.g.: 50 micron resolution from 100 micron). This technology, however, has had many problems with the reader, not the least issue is that the plates are made of delicate crystals of a glass like phosphor material. This phosphor is organized in tall "needles" that provide a high level of signal output when stimulated by laser light. These needles are prone to breaking if the cassette is dropped. What is needed for these advanced imaging plates, along with traditional imaging plates, is a device and method of scanning and processing the retained images without bending and handling stress.

SUMMARY

The present invention provides a cassette device for supporting an imaging means or image retaining device that allows reading or scanning of the imaging means without removal from the cassette. For purposes of this disclosure, the imaging means may include an imaging plate such as a CR plate, a plate made from a photostimulatable phosphor material, x-ray film, a DR plate or the like, including multiples of each. In the preferred embodiment, the present cassette device fits to existing reading devices in the same manner as presently known.

This present invention provides an enclosure adapted for supporting at least one imaging plate for use in a computed radiography or similar device. The enclosure comprises a first flat side having an exposure window and a second flat side generally opposite the first side. The enclosure also includes at least one side section interconnecting the first and second sides. One side may be removable to allow the installation and removal of the imaging plate. The enclosure is adapted to allow the computed radiography device to scan the imaging plate within the enclosure through the exposure window without the need to open the enclosure or otherwise handle the imaging plate.

The enclosure or cassette of the present invention includes a glass sheet with a cover over it. Once produced, the cover is raised, for example, as a copy machine cover is raised, and a CR plate or plates are placed face down on the glass sheet. In the present method, these plates can then be read by passing the glass cassette past the scan head of the image reading device, and thereafter the image erased using high energy LED lamps or similar energy means. In addition to other advantages, the glass cassette provides for images with less schott noise than simply reading a rigid cassette/plate assembly. Typically, this noise is present in the background of any x-ray image as well as for CR images.

BRIEF DESCRIPTION OF THE DRAWINGS

FIG. 1A shows a front view of the present invention.
FIG. 1B shows a side view of the present invention.
FIG. 2A shows a front perspective view of the present invention with the cover in an opened position.
FIG. 2B shows front perspective view of the present invention with the cover in the closed position.
FIG. 3A a diagram of a CR device with a cassette assembly being moved into position for installation.
FIG. 3B is a diagram of a CR device with a cassette assembly attached.
FIG. 3C a diagram of a CR device with a cassette assembly installed in place.

DETAILED DESCRIPTION OF THE PREFERRED EMBODIMENTS

Existing CR cassette designs and methods include a CR scanning cycle of a rigid, flat cassette and imaging plate assembly without requiring the removal of the imaging plate from the cassette. In this design, the CR cassette is opened during the scan process to allow access to the imaging plate. This generally creates a precise, flat read cycle of the imaging plate limited only by the precision of the drive mechanism employed to open and move the cassette past the scan head. In this preferred scan process, nothing touches the surface of the phosphor plate and the imaging plate is kept flat over the area being scanned. As the cassette passes the scanning head of the CR, at least one side of the cassette is opened, exposing the imaging plate. This creates a scan cycle that reduces wear on the phosphor material of the imaging means, greatly enhancing the lifetime of the imaging means and improves the quality of the read cycle. In addition, the scan time is much reduced because the removal and transport of the imaging plate from the cassette is not necessary for a cycle.

Referring now to FIGS. 1a and 1b, the present invention provides a novel imaging plate cassette design 100 that is also functional in the presently available reading device described above. The invention 100 provides an alternative to existing cassette designs by providing an enclosure having a translucent section within a side that is embedded in or supported by a frame. Preferably, the frame is made from a Delrin or other plastic but can also be made from aluminum or most any other structural type material. The frame and sides of the enclosure 100 may also be made from a rigid and lightweight material such as a honeycomb. The translucent section of the side of the cassette 100 is adapted to provide an exposure window for the imaging plate or film secured within the cassette. In the preferred embodiment, the translucent section a glass plate. Preferably, the cassette has a shaped edge that mates to the drive mechanism of the reading device. In the preferred embodiment, the edge is made from a shaped aluminum material but may also be made from a plastic or other metal material.

Referring now to FIGS. 2a and 2b, the present cassette 100 includes a cover 102 which is preferably provided on the back side of the cassette and that is adapted to open similar to a book cover. The cover 102 is adapted to allow for the placement of the imaging plate or plates (i.e., CR plate) or other film, face down on the side of the cassette opposite the cover 104. This side 104 includes the translucent section and is preferably a sheet of clear glass. Because the CR process generally requires blue and red light, the translucent surface is adapted to ensure the transmission of these wavelengths. As noted, the translucent portion preferably covers all or most of side 104 of the enclosure 100 but may also simply cover a sufficient portion of side 104 to allow for the successful imaging and image retrieval from the imaging plate or plates. The interface between such translucent portion and any non translucent portion may be accomplished by any traditional means. In addition, side 104 may include multiple sections, each having differing transmissive properties.

The back side or cover 100 may include a layer of foam 106 or other flexible material, such as a plastic, on the inner surface. This foam 106 advantageously presses on the back side of the imaging plate once it is placed on the glass 104 or other translucent surface similar to the traditional paper copy machine process. The imaging plate may also be more permanently secured to the cover 102 or even the edges of the translucent side 104 using an adhesive or even mechanical securing means such as clips, etc. The cover 102 preferably does not project above the outer edge of the rim 103 of the cassette 100. This allows the cassette 100 to be scanned through the CR device without catching brushes that typically hold the cassette against the scan head.

In the preferred method, an imaging plate or plates are secured within the present enclosure 100 by opening the cover 102 and placing the imaging plate against the opposing or translucent surface 104. The cover 102 is closed and secured shut. Generally, the cover 102 is secured using an embedded magnet at the edge of the frame 103. The cover 102, however, may be secured using clips, screws, adhesives, Velcro, or any other means as is known in securing covers closed. There is an indent in the plastic frame that allows a finger to be placed under the door and counteract the magnetic force holding the door closed.

The imaging plate may already hold an image or may be blank and ready for use. In the later case, the imaging plate would then be exposed to energy to create an image. For example, the entire cassette assembly 100 may brought into the x-ray room and the imaging plate exposed with the desired image. The enclosure or cassette 100 would then be taken and placed within the image reading device 107 (see FIGS. 3a-3c).

Once installed on the image reading device 107, the imaging plate or plates are exposed to the scanning energy such as an exciting laser energy without the need to open the cassette 100. The proper placement of the cassette 100 against the image reading device 107 is assured through the use of at least one mechanical coupling device 108 that secures the cassette to the image reading device. For example, one side of the cassette 100 may include a specially formed channel that couples with a compatible channel on the image reading device 108 to ensure the translucent portion 104 of the cassette 100 is exposed to the scanning energy or otherwise facing inwardly to the image reading device.

Preferably, the method also involves driving the cassette 100 and internally secured plate or plates past an image erasure source such as erasure lights. The present invention may further incorporate a cover over the translucent side 104 on the scan side to allow for transport of the translucent cassette 100 to a remote location for loading of the imaging plate(s) into it or to prevent scratching or damage to such translucent surface. During the scan or image reading process, this cover would be removed or preferably automatically slid away from over the translucent portion 104 allowing scanning laser and eraser light to pass through the translucent portion.

In another embodiment, the cassette 100 incorporates a translucent section 104 made from a material that can be converted to either an opaque material or a less transmissive material to prevent the undesirable exposure of the imaging plate or film. For example, the cassette 100 may include liquid crystals suspended between two thinner layers of glass or other translucent material. An electric signal could be passed into the cassette as it is being scanned, changing the orientation of the crystals and allowing the desired light to pass (converting the exposure window from opaque to translucent for the desirable radiofrequency). Once the scan process is finished, the electrical charge could be removed, and the crystals align to block light from reaching the CR plates (reverting the exposure window from translucent to opaque to all exposure frequencies). Ideally, the exposure window in this embodiment is normally opaque to all exposure frequencies.

In a specific embodiment, this invention enables the use of a flat scan path image reading device with the cassette of the present invention 100, including a secured imaging plate for use with non destructive testing ("NDT") applications where flexible imaging plates need to be wrapped around objects such a pipes. In the past, users were forced to scan these flexible plates through roller based scanning systems that are slow, create slippage/blurring issues, and damage the plates during the scan process. It can take up to 8 minutes to scan 4 small plates. Using the present glass cassette, all 4 plates can be scanned at one time, resulting in a much shorter scan cycle time.

Another application of the present invention is in the dental field where a full mouth of single tooth x-rays may be taken. These small imaging plates can be arranged on a glass cassette to scan all plates at one time. Multiple patients can be serviced at once using a single or multiple cassettes 100 of the present invention. The present method also incorporates the use of an energy source as part of the scanning and erase cycles to sterilize the imaging plates or film as part of the scan cycle. For example, UV lights may be used to sterilize. The cassette 100 may be constructed from materials that are suited to such sterilization and constructed to minimize the need for such sterilization.

The present invention also contemplates using multiple translucent exposure windows within side 104 that can be pre-loaded with imaging plates, creating a greatly enhanced workflow opportunity for all users, and particularly, both users in the NDT and Dental fields.

The implementation of an additional cover on the cassette to shield the scan side 104 of the cassette 100 from exposure or even from damage can allow the cassettes to be transported in any light or other environment. This presently contemplated cover may include a sliding cover that allows expose of the translucent section during the scan cycle in a similar fashion to the presently available covers.

The translucent exposure window in the cassette 100 advantageously improves the typical image scanned from the plate in that it does not allow "scattered" light to enter the scan head of the CR. In a medical application this advantage is not typically as great as the CR system is traditionally signal starved, but in NDT applications, there is generally plenty of signal, but often artifacts that arise because the stimulating laser excites too much of the plate due to over charge on the plate itself. This embodiment contemplates using a flat rigid or semi rigid cassette device 100, with a removable cover and a translucent section or glass substrate, to hold and scan flexible CR plates and in current commercial CR devices that utilize rollers and manual loading systems for inputting CR plates into the CR. The advantages of the present invention will increase overall scan speed, precision and plate longevity. As noted, the present invention 100 may advantageously be used with the existing CR and DR devices.

In the preferred embodiment, the cassette device 100 comprises a translucent surface 104 that is supported by a picture frame style frame and bumper system 103. The frame assembly supports the translucent section 104, the cover 102 and also serves to guide the cassette 100 past a scanning laser within the image reading device that reads the information latent in the image retaining plates. These plates are placed face down on the glass surface 104 and covered with a flat cover 102 that preferably has a foam/plastic sheet attached to the inside face 106 similar to a traditional copy machine cover.

The cassette 100 can advantageously be sized to accept any imaging plate and can further be adapted for use with most any imaging reading means that uses cassettes.

In the preferred embodiment, the frame 103 includes a formed section along one side to allow one way attachment to the image reading device 107. The cassette 100 can be removed from the CR system 107 by rotating it up to about 45 degrees from the horizontal and pulling the cassette from the machine. This may be done to clean the underside or translucent side 104 of the cassette 100, or to load the cassette remotely before scanning it. In this manner, several cassettes 100 can be loaded, and scanned at a later time.

Another embodiment of the present invention contemplates having an additional sliding cover with a catch that can be automatically slid open as the cassette 100 is driven past the scanning head of the image reading device 107. This sliding cover, as is known in the art, can protect the imaging plates from exposure to light before they are scanned. This additional cover is advantageous if remote loading of the cassettes 100 is to be accomplished without additional light shielding.

SPECIFIC APPLICATIONS

Currently in NDT (Non Destructive Testing) applications, there is a great need for improved image quality. In addition, the possibility to load multiple small imaging plates into a cassette revolutionizes the process of scanning smaller CR plates. For example, pipe or other welds are often examined using x-ray or similar energy. CR plates, often much smaller than 14 inches by 17 inches are wrapped around a pipe and exposed to a high energy x-ray source. Once exposed they are currently placed one at a time in a set of rollers that drive the imaging plates past a image reading head. This process can take minutes for just a few imaging plates. The cassette device 100 of the present invention can greatly speed up this process by, for example, allowing multiple imaging plates to be used with each scan.

The foregoing description of the embodiments of the invention has been presented for the purposes of illustration and description. It is not intended to be exhaustive or to limit the invention to the precise forms or methods disclosed. Persons skilled in the relevant art can appreciate that many modifications and variations are possible in light of the above teaching.

What is claimed is:

1. An enclosure for supporting an image retaining device, comprising:
    (a) a first side having a translucent portion; and
    (b) at least one other side connected to the first side wherein the first and second side provide an enclosure for surrounding at least a portion of the image retaining device;
    (c) wherein the enclosure is adapted to be used with an image reading device.

2. The enclosure of claim 1 wherein the image retaining device is an imaging plate.

3. The enclosure of claim 2 wherein the translucent portion comprises glass.

4. The enclosure of claim 2 wherein the translucent portion is a plastic that is translucent to both red and blue light.

5. The enclosure of claim 2 wherein the enclosure is rigid.

6. The enclosure of claim 5 wherein a first side of the is enclosure comprises glass and a second side, opposing the first side comprises a honeycomb material.

7. The enclosure of claim 6 wherein at least one edge of the enclosure is adapted for coupling with the image reading device.

8. The enclosure of claim 2 wherein the imaging plate is secured to a side of the enclosure opposite the translucent portion such that an image reading device can read the imaging plate within the enclosure through the translucent portion.

9. An enclosure for supporting at least one imaging plate for use in a computed radiography device, comprising:
    (a) a first flat side having an exposure window that allows for the transmission of at least some light energy into and out of the enclosure;
    (b) a second flat side generally opposite the first side;
    (c) at least one side section coupling the first and second sides and generally enclosing the imaging plate between the first and second sides;
    (d) wherein the enclosure is adapted to allow the computed radiography device to read an image stored on the imaging plate through the exposure window without having to open said enclosure.

10. The enclosure of claim 9 wherein the exposure window comprises a clear flat glass.

11. The enclosure of claim 9 wherein the exposure window is made from a crystal.

12. The enclosure of claim 9 wherein the exposure window allows the transmission of at least blue and red light.

13. The enclosure of claim 9 wherein the exposure window is adapted to restrict the transmission of certain wavelengths of light.

14. The enclosure of claim 9 wherein the exposure window is selectable between a first condition allowing the transmission of at least red and blue light and a second condition that restricts the transmission of red and blue light.

15. The enclosure of claim 9 wherein at least one side is removable to allow the placement of the imaging plate within the enclosure.

16. A cassette assembly for use with a computed radiography device comprising:
    (a) a generally flat back side;
    (b) a front side generally opposing the back side and operable relative to the back side so as to allow access within the cassette, the front side having an exposure window for allowing the transmission of energy between a computed radiography device and an imaging plate secured within the cassette between the front and rear sides, and wherein the cassette is adapted to be removably coupled to the computed radiography device.

17. The cassette of claim 16 wherein the exposure window comprises a clear glass.

18. The cassette of claim 17 wherein the front side comprises a frame for supporting a plurality of exposure windows.

19. The cassette of claim 16 further comprising a compressible member secured within the cassette and adapted to secure an imaging plate against the exposure window.

20. The cassette of claim 16 further comprising a removable cover adapted to cover the front side.

* * * * *